Feb. 25, 1964     J. M. LOEB     3,122,664
ELECTRICAL GENERATOR OF MECHANICAL VIBRATIONS
Filed Oct. 30, 1959
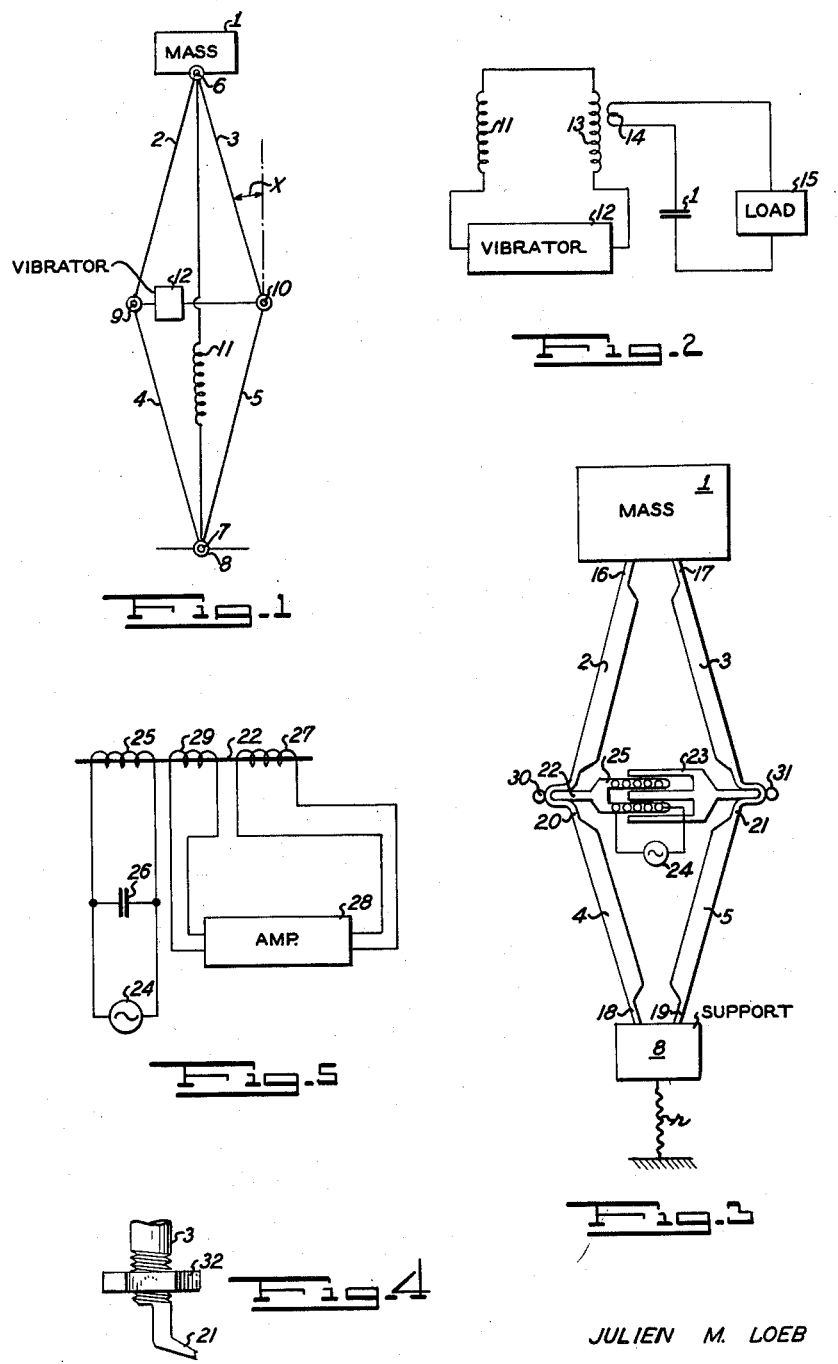
INVENTOR
JULIEN M. LOEB

United States Patent Office 3,122,664
Patented Feb. 25, 1964

3,122,664
ELECTRICAL GENERATOR OF MECHANICAL VIBRATIONS
Julien M. Loeb, Saint-Cloud, France, assignor to Compagnie Generale de Geophysique, Paris, France, a corporation of France
Filed Oct. 30, 1959, Ser. No. 849,887
Claims priority, application France Nov. 21, 1958
8 Claims. (Cl. 310—23)

My invention relates to electrical generators of mechanical vibrations, and more particularly to generators intended for seismic prospection.

Seismic prospection is executed through an analysis of seismic vibrations which have been reflected or refracted inside the ground.

To produce vibrations, the method which is more generally used consists in the detonation of explosive charges. The charges may be buried in the ground, be at ground level or even be above ground. Such explosions produce in the ground the desired vibrations in the form of damped wave-trains.

The use of explosives to develop vibrations has an advantage, in that, it is extremely simple and does not require movement of large and bulky apparatus.

However, that this manner of producing vibrations exhibits various drawbacks is noted as follows. By using explosives there is produced damped wave trains and undamped wave trains cannot be obtained. Thus there cannot be obtained vibrations wherein the amplitude is independent of time. Furthermore, the efficiency of the explosive method is extremely low, since almost the entire energy of the explosion acts upon the immediate ground to cause crushing of the adjacent rocks such that this energy is lost as far as the production of useful vibrations is concerned.

It is known to generate vibrations by resorting to the percussion produced by the dropping of a heavy weight from a substantial height. However, this latter method produces in practice nothing more than vibrations of a very small amplitude, i.e. vibrations of only very small energy, while it is limited also to the production of damped wave-trains.

It has also been proposed to resort to electro-mechanical vibrators, but the latter have not hitherto led to satisfactory results by reason, in particular, of the complete impossibility of making such vibrators meet the particular conditions of use for seismic prospection.

As a matter of fact, experience shows that the vibrators of known type are not suitable for transferring under satisfactory operative conditions the enery of the vibrations produced to the ground through which they are to pass. In other words, said vibrators form generators with a high internal impedance R which feeds a very low impedance $r$, so that the efficiency which is substantially proportional to the ratio $$\frac{r}{R+r}$$

is extremely small.

The expression "impedance" is intended to cover in the present case and in accordance with the well-known similarity between electrical and mechanical vibrations, the meaning of the ratio at a predetermined point between the speed assumed by said point and the force to which it is subjected.

My invention has for a principal object the execution of a generator of a novel type which is designed so as to increase as much as possible the efficiency of operation, in particular by providing for an adjustment under better conditions than in existing systems.

According to the invention, a better matching is obtained by resorting simultaneously to the two following concepts:

I resort to resonance phenomena in order to increase the amplitude of the oscillations produced by the actual vibrator;

I make use of a transformer which has for its result a multiplication of the apparent impedance of the ground by the square of the transformation ratio, which ratio is larger than unity.

Consequently, the generator of vibrations designed in conformity with the invention includes chiefly the actual vibrator carried by an inert mass of a suitable size and transmitting the vibrations produced by it to the ground, through an elastic connection and a transformer, the elastic connection being established in a manner such that the system including the inert mass and the elastic connection may become resonant for the frequency of the oscillations produced.

The practical application of these two concepts may be performed in various manners:

I will first describe, solely by way of exemplification and by no means in a limiting sense, a particularly advantageous manner of executing my invention, according to which resonance is obtained mechanically, while the transformer is also of a mechanical type.

The generator includes an inert mass bearing on the ground through the agency of the transformer constituted by a pantograph transforming the mechanical horizontal oscillations produced by the actual vibrator into vertical oscillations of a lesser amplitude and of an increased intensity.

Furthermore, a spring is inserted between the inert mass and the ground, said spring forming the elastic system which provides for resonance of the inert mass for the frequency of the oscillations produced by the vibrator.

The actual vibrator is constituted preferably, but not necessarily, in a manner known per se, by a movable coil adapted to move in a magnetic field.

Experience shows, as already mentioned, that the ground appears, as far as the vibrations are concerned, as an impedance including a real component or a resistance which is very small and is, in fact, much lower than the impedance of the vibration generator.

It is therefore of interest to increase, as much as possible, the apparent resistance of the ground. The fact of resorting to resonance phenomena through an arrangement showing a factor $\varphi$ which may reach easily for instance $10^3$, allows multiplying by the square of said number, i.e. $10^6$, the apparent resistance of the ground. Similarly, the use of a transformer with a transformation ratio which may be rendered easily equal to $10^2$ or more provides a further multiplication by the square of $10^2$ so that, finally, the apparent resistance is multiplied by the square of the product of the two above figures, to wit: $10^{10}$.

I have illustrated, by way of example, my invention in the accompanying drawings, wherein:

FIG. 1 is a diagrammatic illustration of a generator according to my invention.

FIG. 2 is a wiring diagram corresponding to FIG. 1.

FIG. 3 illustrates a second embodiment of said generator.

FIG. 4 shows a detail thereof.

FIG. 5 is a wiring diagram relating to a portion of FIG. 3.

The generator illustrated in FIG. 1 includes a mass 1 carried at the end of a pantograph including the arms 2, 3, 4 and 5, the arms 2 and 3 being pivotally connected at the apex 6 carried by the mass 1, while the arms 4 and 5 are pivotally connected at the apex 7 carried by the support 8 on the ground. Lastly, the arms 2 and 4 are pivotally secured at the apex 9 and the arms 3 and 5 are pivotally connected at the apex 10.

A spring 11 forming the elastic system is connected through suitable rods across the pivotal connections 6 and 7. The actual vibrator 12 is similarly connected through suitable rods across the pivotal connections 9 and 10. The vibrations generated by said vibrator produce a reciprocatory movement of the pivotal connections 9 and 10 towards and away from each other. The mass 1 is held in its vertical position by guiding means which are not illustrated.

I have shown in the drawings arms 2, 3, 4 and 5 which are oblique with reference to verticality; as a matter of fact, the angle of said arms with the vertical line shown at $x$ may be very small, for instance of the order of $1/100$ radian, which leads to a transformation ratio equal to $10^2$. In other words, a vibration of an amplitude equal to one centimeter executed by the vibrator corresponds to a vibration of an amplitude of $1/10$ mm. exerted on the support 8.

FIG. 2 shows the corresponding wiring diagram for the generator of FIG. 1. The vibrator 12 forms, as illustrated, the equivalent of a supply of A.C. voltage and the spring 11 the equivalent of an inductance coil; the pantograph is shown as a transformer, the primary 13 of which is inserted in series with the coil 11 and the supply 12, while the secondary 14 feeds in series across its terminals the load 15 and a condenser, which corresponds electrically to the inert mass 1.

Calculation shows that it would be difficult to produce a helical spring 11 operating under the conditions illustrated in FIG. 1 and having the essential mechanical properties required. Consequently, in the second embodiment according to my invention, said spring is constituted by a system of bending resilient elastic blades which also constitute the pivotal connections of the pantograph. Thus, the embodiment illustrated in FIG. 3 includes, as precedingly, the mass 1 and the pantograph with its arms 2, 3, 4 and 5 constituted in the present case by metal bars interconnected by thin ends 16—17 and 18—19 respectively with the support 8 and with the mass 1. Said thin end sections may bend slightly and cooperate each as far as it is concerned in the formation of an elastic system equivalent to the spring 11 illustrated in FIG. 1. Similarly, the arms 2 and 4, on the one hand, and 3 and 5, on the other hand, are interconnected by thin sections 20 and 21 respectively which correspond to the pivotal connections 9 and 10 and cooperate also in the execution of the elastic system.

The spring-forming sections 16 to 21 require only a very slight bending to produce the desired movements, since the amplitudes of the movements are small. As in the case of FIG. 1, the actual vibrator inserted between the flexible sections 20 and 21 is of any suitable type adapted to impart horizontal vibrations of the desired amplitude and frequency to said sections 20 and 21.

I have illustrated, by way of example, in said FIG. 3, a vibration generator of the type including a moving coil carried by a cylindrical member 22 rigid with the flexible section 20 that can move rectilinearly inside a coaxial member 23 carried by the opposite flexible section 21. Said coaxial section carries the means required for producing a radial magnetic field of a sufficient intensity. This type of generator including a moving coil is well known and has been illustrated therefore only in a conventional manner.

An alternating current of a suitable frequency produced by the source of A.C. 24 is sent into the moving coil 25 carried by the member 22 and produces consequently a horizontal vibration of the section 21 with reference to the section 20, so that the sections 20 and 21 move towards and away from each other, and the pantograph provides then for a transformation of the horizontal vibrations of a much smaller amplitude, but of a correspondingly increased intensity.

I have shown symbolically at $r$ in FIG. 3 a spring forming the equivalent of the mechanical radiation resistance of the ground.

The vibratory frequencies which are of the greatest interest for seismic prospection range, according to the ground to be considered, are between 10 and 30 cycles per second and it is therefore of interest to allow an adjustment of the frequency of the vibrations produced.

To this end, it is necessary to modify the frequency of the voltage supplied by the source 24, which is an easy matter, and to simultaneously modify the resonant frequency of the mass 1.

It is not possible to act to this end on the flexibility of the springs constituted by elastic elements 16 to 21 and it would not be practical to modify the value of the mass 1; it is therefore necessary to resort to other means and calculation shows that the frequency of the resonance does not depend only on the value of the mass 1 and on the resiliency of the springs, but also on the magnitude of the moment of inertia of the pantograph arms.

Consequently and in accordance with my invention, I adjust the resonance frequency, on one hand, through a modification of the moment of inertia of each arm of the pantograph and, on the other hand, through incorporation of further masses on pivotal connections at 20 and 21.

Preferably, said auxiliary masses are secured fixedly while a fine adjustment may be obtained through a modification of the value of the moment of inertia, so as to adjust in an accurate manner the frequency of resonance. I have illustrated diagrammatically at 30 and 31 the auxiliary masses secured to the elastic sections 20 and 21.

FIG. 4 illustrates a possible manner of adjusting the moment of inertia of one of the arms, for instance the arm 3.

In said FIG. 4, the end of the arm 3 is shown on an enlarged scale and it is made advantageously for this purpose of a cylindrical shape provided with a thread on which may be screwed to an adjustable extent a nut 32 forming an additional mass, the longitudinal shifting of which over the arm 3 modifies, as will be readily apparent the value of the moment of inertia of said arm. Of course, this is only an example corresponding to one of the numerous possible adjusting methods.

It is also possible to operate electrically and this may be obtained simply by inserting in parallel with the moving coil 25 a preferably adjustable condenser.

FIG. 5 shows such a condenser at 26 incorporated in the electric circuit associated with the moving coil 25 carried by the core 22.

Lastly, it is possible to modify the value of the Q factor by compensating the losses in any manner well known per se, for instance through the application of a positive reaction. This is obtained for instance, as shown in FIG. 5, by inserting on the core 22 two further windings coaxially with the winding 25, the first winding 27 being connected with the input of an implifier 28 providing a suitable gain and feeding the third winding 29 on the core.

If the spacing between the elastic sections 20 and 21 is not sufficient for housing the actual vibrator, it is always possible to position the latter outside the arms of the pantograph and to connect its two relatively movable parts, by means of suitable rods, respectively to the sections 20 and 21.

Obviously, many modifications other than those described may be incorporated with the purely diagrammatic embodiment illustrated, without unduly widening thereby the scope of the invention as defined in the accompanying claims.

It will be remarked that a vibrator of the type disclosed shows the advantage of being capable of operating throughout the desired time interval and of producing undamped vibrations of an unvarying amplitude, of which it is easy to modify the frequency through the arrangements described, taking into account for instance the results obtained by a first test, so as to better show out such or such a feature of the ground to be examined.

What is claimed is:

1. A vibration generator adapted for generating undamped vibrations in the ground, said generator comprising vibration means for generating vibrations of determinable magnitude and frequency and resonating means coupled to the vibration means and tuned substantially to the same frequency thereof, said resonating means being supported on the ground for applying substantially undamped vibrations thereto, said resonating means including mechanical transformer means having a transformation ratio greater than unity for reducing the magnitude of the vibrations in the resonating means relative to the vibration means to cause the resonating means to deliver vibration of increased intensity to the ground.

2. A vibration generator as claimed in claim 1 wherein said resonating means includes elastic means operatively associated with the vibration means to vibrate at substantially the same frequency thereof and an inertia mass supported by said elastic means, said mechanical transformer means being constituted by a pantograph.

3. A vibration generator adapted for generating undamped vibrations in the ground, said generator comprising a plurality of arms pivotally connected together to form a pantograph of parallelogram shape which is vertically elongated, said pantograph having a lower apex supported on the ground, said parallelogram being oriented to have horizontal and vertical diagonals, vibration means supported by said pantograph along the horizontal diagonal thereof for generating vibrations of determinable magnitude and frequency in a horizontal direction, elastic means supported in said pantograph along the vertical diagonal thereof, and an inert mass rigidly coupled to the pantograph at the upper apex thereof, said pantograph and the elastic means being resonant with the vibrations generated by the vibration means, said pantograph causing reduction of the magnitude of the vibrations in a vertical direction to apply vibrations of increased force to the ground in substantially undamped and continuous manner.

4. A vibration generator as claimed in claim 3 comprising means for varying the elasticity of the elastic means to vary the magnitude of the vibrations thereof.

5. A vibration generator as claimed in claim 3 wherein said vibration means include a magnetic element rigidly connected to an apex of the pantograph on the horizontal diagonal thereof, a winding on the other of the apices of the pantograph on the horizontal diagonal, the winding and magnetic element moving relatively to one another in vibrating fashion along said horizontal diagonal with the magnetic element energized by an A.C. source and means for tuning the frequency of the relative movement between the magnetic element and the winding.

6. A vibration generator adapted for generating undamped vibrations in the ground, said generator comprising a plurality of arms interconnected together to form a vertically elongated parallelogram having horizontal and vertical diagonals, each arm having ends of reduced inertia to provide flexibility thereat whereby said parallelogram constitutes a flexible pantograph, said pantograph having a lower apex supported on the ground, vibration means supported by said pantograph along the horizontal diagonal thereof for generating vibrations of determinable magnitude and frequency in a horizontal direction, and an inert mass rigidly coupled to the pantograph at the upper apex thereof, said pantograph and mass constituting an elastic system which is adaped to vibrate in a vertical direction at the same frequency as said vibration means, said pantograph causing reduction of the magnitude of the vibrations in a vertical direction to apply vibrations of increased force to the ground in substantially undamped and continuous manner.

7. A vibration generator as claimed in claim 6 wherein said arms have moments of inertia which influence the flexibility of the pantograph, the generator comprising means on said arms for varying the moments of inertia thereof to vary the flexibility of the pantograph accordingly.

8. A vibration generator adapted for generating undamped vibrations in the ground, said generator comprising first and second pairs of arms, each pair including two arms connected in end to end relation and forming an obtuse angle therebetween, each arm having an end of reduced size to provide flexibility thereat, said pairs of arms being arranged in symmetrical fashion about a substantially vertical axis, a mass supported on said pairs of arms substantially on said vertical axis, said pairs of arms defining substantially horizontally aligned vertices, a magnetic element coupled to one of the vertices, an electrical winding coupled to the other of the vertices, said winding and magnetic element being operatively positioned relative to one another to vibrate with respect to one another when the winding is energized by an A.C. source, said pairs of arms being supported on the ground and adapted to apply vibrations thereto, said arms constituting a flexible pantograph which is adapted to vibrate in resonant fashion with said winding and magnetic element and at the same frequency therewith, said pantograph causing reduction in the magnitude of the amplitude in the vertical direction relative to the magnitude of the vibrations in the horizontal direction, said arms having moments of inertia which influence the flexibility of the pantograph, and means on the arms for varying the moments of inertia thereof to respectively vary the flexibility of the pantograph.

References Cited in the file of this patent

UNITED STATES PATENTS

| | | |
|---|---|---|
| 1,672,807 | Etzel | June 5, 1928 |
| 1,718,357 | Hutchison | June 25, 1929 |
| 2,742,606 | Wann | Apr. 17, 1956 |
| 3,058,539 | Adler | Oct. 16, 1962 |